United States Patent [19]

Brown et al.

[11] Patent Number: 4,806,297

[45] Date of Patent: Feb. 21, 1989

[54] SOLVENT-RESISTANT, COMPATIBLE BLENDS OF POLYPHENYLENE ETHERS AND LINEAR POLYESTERS

[75] Inventors: Sterling B. Brown, Schenectady; John B. Yates, III, Glenmont, both of N.Y.

[73] Assignee: General Electric Company, Schenectady, N.Y.

[21] Appl. No.: 144,218

[22] Filed: Jan. 15, 1988

Related U.S. Application Data

[63] Continuation-in-part of Ser. No. 891,457, Jul. 29, 1986, which is a continuation-in-part of Ser. No. 761,712, Aug. 2, 1985, abandoned, and a continuation-in-part of Ser. No. 828,410, Feb. 11, 1986, abandoned.

[51] Int. Cl.$^4$ ................................................. B29B 7/84
[52] U.S. Cl. ............................... 264/102; 264/331.16; 525/92; 525/905; 528/212; 528/215; 528/216
[58] Field of Search ........................... 264/102, 331.16; 528/215, 216, 212; 525/92

[56] References Cited

U.S. PATENT DOCUMENTS

| | | |
|---|---|---|
| 4,369,278 | 1/1983 | Kasahara et al. . |
| 4,591,467 | 5/1986 | Koyernicky ........................ 264/102 |
| 4,732,938 | 3/1988 | Grant et al. . |

*Primary Examiner*—Jacob Ziegler
*Attorney, Agent, or Firm*—William H. Pittman; James C. Davis, Jr.; James Magee, Jr.

[57] ABSTRACT

Impact- and solvent-resistant resin blends are prepared from a polyphenylene ether, or blend thereof with a polystyrene, a linear polyester such as a poly(alkylene dicarboxylate), at least one elastomeric polyphenylene ether-compatible impact modifier and at least one polymer containing a substantial proportion of aromatic polycarbonate units as a compatibilizing agent. There may also be present a minor amount of at least one epoxide and/or masked isocyanate such as triglycidyl isocyanurate or a glycidyl methacrylate polymer. The polyphenylene ether is preferably inactivated by reaction with at least one non-volatile carboxylic acid or anhydride and/or by extrusion with vacuum venting.

7 Claims, No Drawings

SOLVENT-RESISTANT, COMPATIBLE BLENDS OF POLYPHENYLENE ETHERS AND LINEAR POLYESTERS

This application is a continuation-in-part of application Ser. No. 891,457, filed July 29, 1986, which in turn is a continuation-in-part of applications Ser. No. 761,712, filed Aug. 2, 1985, and Ser. No. 828,410, filed Feb. 11, 1986, both now abandoned.

This invention relates to novel resinous compositions with high impact resistance, solvent resistance, tensile strength and thermal stability. More particularly, it relates to improved compositions comprising polyphenylene ethers and linear polyesters.

The polyphenylene ethers are a widely used class of thermoplastic engineering resins characterized by excellent hydrolytic stability, dimensional stability, toughness, heat resistance and dielectric properties. They are also resistant to high temperature conditions under many circumstances. Because of the brittleness of many compositions containing polyphenylene ethers, they are frequently blended with impact modifiers such as elastomers to form molding compositions.

A disadvantage of the polyphenylene ethers which militates against their use for molding such items as automotive parts is their low resistance to non-polar solvents such as gasoline. For increased solvent resistance, it would be desirable to blend the polyphenylene ethers with resins which have a high degree of crystallinity and therefore are highly resistant to solvents. Illustrative of such resins are the linear polyesters including poly(alkylene dicarboxylates), especially the poly(alkylene terephthalates). However, such blends frequently undergo phase separation and delamination. They typically contain large, incompletely dispersed polyphenylene ether particles and no phase interaction between the two resin phases. Molded parts made from such blends are typically characterized by extremely low impact strength.

The present invention provides polymer blends having a high degree of impact resistance and solvent resistance. It also provides highly compatible polymer blends containing polyphenylene ethers and poly(alkylene dicarboxylates), and resinous molding compositions suitable for use in the fabrication of automotive parts and the like.

The invention is based on the discovery of a new genus of compatible blends containing polyphenylene ethers and poly(alkylene dicarboxylates) in weight ratios as high as 1:1, or even higher under certain circumstances, and a method for their preparation. According to the invention, there are also incorporated in the resinous composition an impact modifier and a compatibilizing agent containing a substantial proportion of aromatic polycarbonate structural units.

In one of its aspects, therefore, the invention is directed to resinous compositions comprising the following resinous components and any reaction products thereof, all percentage proportions being by weight of total resinous components:

(A) about 10–45% of at least one polyphenylene ether, or a blend thereof with at least one polystyrene;

(B) about 10–45% of at least one poly(alkylene dicarboxylate), the weight ratio of component A to component B being at most 1.2:1;

(C) about 8–25% of at least one elastomeric polyphenylene ether-compatible impact modifier; and (D) from 3% to about 40% of at least one polymer containing a substantial proportion of aromatic polycarbonate units and having a weight average molecular weight of at least about 40,000 as determined by gel permeation chromatography relative to polystyrene, or a blend thereof with a styrene homopolymer.

It is not certain whether any or all of the components in these compositions interact chemically upon blending. Therefore, the invention includes compositions comprising said components and any reaction products thereof, as well as other optional components described hereinafter.

The polyphenylene ethers (also known as polyphenylene oxides) used as all or part of component A in the present invention comprise a plurality of structural units having the formula

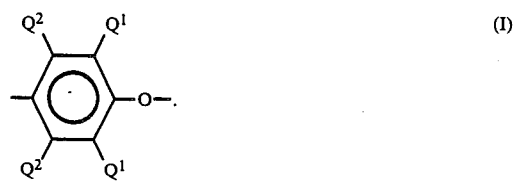

In each of said units independently, each $Q^1$ is independently halogen, primary or secondary lower alkyl (i.e., alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Examples of suitable primary lower alkyl groups are methyl, ethyl, n-propyl, n-butyl, isobutyl, n-amyl, isoamyl, 2-methylbutyl, n-hexyl, 2,3-dimethylbutyl, 2-, 3- or 4-methylpentyl and the corresponding heptyl groups. Examples of secondary lower alkyl groups are isopropyl, sec-butyl and 3-pentyl. Preferably, any alkyl radicals are straight chain rather than branched. Most often, each $Q^1$ is alkyl or phenyl, especially $C_{1-4}$ alkyl, and each $Q^2$ is hydrogen. Suitable polyphenylene ethers are disclosed in a large number of patents.

Both homopolymer and copolymer polyphenylene ethers are included. Suitable homopolymers are those containing, for example, 2,6-dimethyl-1,4-phenylene ether units. Suitable copolymers include random copolymers containing such units in combination with (for example) 2,3,6-trimethyl-1,4-phenylene ether units. Many suitable random copolymers, as well as homopolymers, are disclosed in the patent literature.

Also included are polyphenylene ethers containing moieties which modify properties such as molecular weight, melt viscosity and/or impact strength. Such polymers are described in the patent literature and may be prepared by grafting onto the polyphenylene ether in known manner such vinyl monomers as acrylonitrile and vinylaromatic compounds (e.g., styrene), or such polymers as polystyrenes and elastomers. The product typically contains both grafted and ungrafted moieties. Other suitable polymers are the coupled polyphenylene ethers in which the coupling agent is reacted in known manner with the hydroxy groups of two polyphenylene ether chains to produce a higher molecular weight polymer containing the reaction product of the hydroxy groups and the coupling agent. Illustrative coupling agents are low molecular weight polycarbonates, quinones, heterocycles and formals.

The polyphenylene ether generally has a number average molecular weight within the range of about 3,000–40,000 and a weight average molecular weight within the range of about 20,000–80,000, as determined by gel permeation chromatography. Its intrinsic viscosity is most often in the range of about 0.15–0.6 and preferably at least 0.25 dl./g., as measured in chloroform at 25° C.

The polyphenylene ethers are typically prepared by the oxidative coupling of at least one corresponding monohydroxyaromatic compound. Particularly useful and readily available monohydroxyaromatic compounds are 2,6-xylenol (wherein each $Q^1$ is methyl and each $Q^2$ is hydrogen), whereupon the polymer may be characterized as a poly(2,6-dimethyl-1,4-phenylene ether), and 2,3,6-trimethylphenol (wherein each $Q^1$ and one $Q^2$ is methyl and the other $Q^2$ is hydrogen).

A variety of catalyst systems are known for the preparation of polyphenylene ethers by oxidative coupling. There is no particular limitation as to catalyst choice and any of the known catalysts can be used. For the most part, they contain at least one heavy metal compound such as a copper, manganese or cobalt compound, usually in combination with various other materials.

A first class of preferred catalyst systems consists of those containing a copper compound. Such catalysts are disclosed, for example, in U.S. Pat. Nos. 3,306,874, 3,306,875, 3,914,266 and 4,028,341. They are usually combinations of cuprous or cupric ions, halide (i.e., chloride, bromide or iodide) ions and at least one amine.

Catalyst systems containing manganese compounds constitute a second preferred class. They are generally alkaline systems in which divalent manganese is combined with such anions as halide, alkoxide or phenoxide. Most often, the manganese is present as a complex with one or more complexing and/or chelating agents such as dialkylamines, alkanolamines, alkylenediamines, o-hydroxyaromatic aldehydes, o-hydroxyazo compounds, ω-hydroxyoximes (monomeric and polymeric), o-hydroxyaryl oximes and β-diketones. Also useful are known cobalt-containing catalyst systems. Suitable manganese and cobalt-containing catalyst systems for polyphenylene ether preparation are known in the art by reason of disclosure in numerous patents and publications.

The polyphenylene ethers which may be used in the invention include those which comprise molecules having at least one of the end groups of the formulas

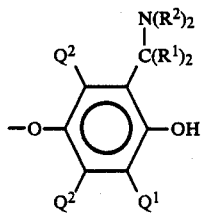

(II)

and

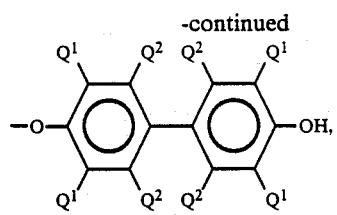

(III)

wherein $Q^1$ and $Q^2$ are as previously defined; each $R^1$ is independently hydrogen or alkyl, with the proviso that the total number of carbon atoms in both $R^1$ radicals is 6 or less; and each $R^2$ is independently hydrogen or a $C_{1-6}$ primary alkyl radical. Preferably, each $R^1$ is hydrogen and each $R^2$ is alkyl, especially methyl or n-butyl.

Polymers containing the end groups of formula II (hereinafter "aminoalkyl end groups") may be obtained by incorporating an appropriate primary or secondary monoamine as one of the constituents of the oxidative coupling reaction mixture, especially when a copper- or manganese-containing catalyst is used. Such amines, especially the dialkylamines and preferably di-n-butylamine and dimethylamine, frequently become chemically bound to the polyphenylene ether, most often by replacing one of the α-hydrogen atoms on one or more $Q^1$ radicals. The principal site of reaction is the $Q^1$ radical adjacent to the hydroxy group on the terminal unit of the polymer chain. During further processing and/or blending, the aminoalkyl end groups may undergo various reactions, probably involving a quinone methide-type intermediate of the formula

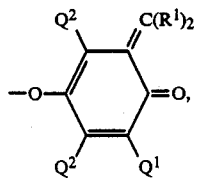

(IV)

with numerous beneficial effects often including an increase in impact strength and compatibilization with other blend components. Reference is made to U.S. Pat. Nos. 4,054,553, 4,092,294, 4,477,649, 4,477,651 and 4,517,341, the disclosures of which are incorporated by reference herein.

Polymers with 4-hydroxybiphenyl end groups of formula III are typically obtained from reaction mixtures in which a by-product diphenoquinone of the formula

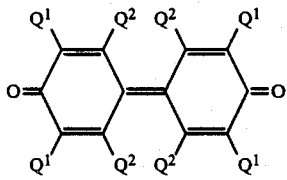

(V)

is present, especially in a copper-halide-secondary or tertiary amine system. In this regard, the disclosure of U.S. Pat. No. 4,477,649 is again pertinent as are those of U.S. Pat. No. 4,234,706 and 4,482,697, which are also incorporated by reference herein. In mixtures of this type, the diphenoquinone is ultimately incorporated into the polymer in substantial proportions, largely as an end group.

In many polyphenylene ethers obtained under the above-described conditions, a substantial proportion of the polymer molecules, typically constituting as much as about 90% by weight of the polymer, contain end groups having one or frequently both of formulas II and III. It should be understood, however, that other end groups may be present and that the invention in its broadest sense may not be dependent on the molecular structures of the polyphenylene ether end groups.

It will be apparent to those skilled in the art from the foregoing that the polyphenylene ethers contemplated for use in the present invention include all those presently known, irrespective of variations in structural units or ancillary chemical features.

The use of polyphenylene ethers containing substantial amounts of unneutralized amino nitrogen may, under certain conditions, afford compositions with undesirably low impact strengths. The possible reasons for this are explained hereinafter. The amino compounds include, in addition to the aminoalkyl end groups, traces of amine (particularly secondary amine) in the catalyst used to form the polyphenylene ether.

It has further been found that the properties of the compositions can often be improved in several respects, particularly impact strength, by removing or inactivating a substantial proportion of the amino compounds in the polyphenylene ether. Polymers so treated are sometimes referred to hereinafter as "inactivated polyphenylene ethers". They preferably contain unneutralized amino nitrogen, if any, in amounts no greater than 800 ppm. and more preferably in the range of about 200-800 ppm. Various means for inactivation have been developed and any one or more thereof may be used.

One such method is to precompound the polyphenylene ether with at least one non-volatile compound containing a carboxylic acid, acid anhydride or ester group, which is capable of neutralizing the amine compounds. This method is of particular interest in the preparation of compositions of this invention having high resistance to heat distortion. Illustrative acids, anhydrides and esters are citric acid, malic acid, agaricic acid, succinic acid, succinic anhydride, maleic acid, maleic anhydride, citraconic acid, citraconic anhydride, itaconic acid, itaconic anhydride, fumaric acid, diethyl maleate and methyl fumarate. Because of their relatively high reactivity with amino compounds, the free carboxylic acids and especially fumaric acid are generally most useful.

Reaction of the polyphenylene ether with the acid or anhydride may be achieved by heating at a temperature within the range of about 230°-390° C., in solution or preferably in the melt. In general, about 0.3-2.0 and preferably about 0.5-1.5 part (by weight) of acid or anhydride is employed per 100 parts of polyphenylene ether. Said reaction may conveniently be carried out in an extruder or similar equipment.

Another method of inactivation is by extrusion of the polyphenylene ether under the above-described conditions with vacuum venting. This may be achieved either in a preliminary extrusion step (which is sometimes preferred) or during extrusion of the composition of this invention, by connecting the vent of the extruder to a vacuum pump capable of creating a pressure of about 20 torr or less.

It is believed that these inactivation methods aid in the removal by evaporation or the neutralization of any traces of free amines (predominantly secondary amines) in the polymer, including amines generated by conversion of aminoalkyl end groups to quinone methides of the type represented by formula IV. Polyphenylene ethers having a free amine nitrogen content below about 600 ppm. have been found particularly useful in this invention. However, the invention is not dependent on any theory of inactivation.

The preparation of inactivated polyphenylene ethers by reaction with acids or anhydrides, together with vacuum venting during extrusion, is illustrated by the following examples. All parts in the examples herein are by weight.

EXAMPLE 1

A mixture of 1.43 parts of maleic anhydride and 100 parts of a poly-(2,6-dimethyl-1,4-phenylene ether) having a number average molecular weight (as determined by gel permeation chromatography) of about 20,000 and an intrinsic viscosity in chloroform at 25° C. of 0.46 dl./g. was tumble-mixed for 15-30 minutes and then extruded on a 20-mm. twin screw extruder at 400 rpm. over a temperature range of about 310°-325° C. The feed rate of the mixture was about 524 grams per 10 minutes. The extruder was vacuum vented with a vacuum pump to a pressure less than 20 torr during the extrusion. The product was the desired inactivated polyphenylene ether.

EXAMPLES 2-5

The procedure of Example 1 was repeated, substituting 0.7, 0.8, 1.0 and 1.4 parts (respectively) of fumaric acid for the maleic anhydride and extruding over a temperature range of about 300°-325° C. Similar products were obtained.

EXAMPLE 6

The procedure of Example 2 was repeated, substituting 0.7 part of citric acid for the fumaric acid. A similar product was obtained.

Component A may also contain at least one polystyrene. The term "polystyrene" as used herein includes polymers prepared by methods known in the art including bulk, suspension and emulsion polymerization, which contain at least 25% by weight of structural units derived from a monomer of the formula

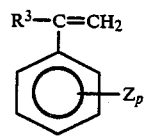

$$R^3-C=CH_2 \quad \text{(VI)}$$

with $Z_p$ on the phenyl ring wherein $R^3$ is hydrogen, lower alkyl or halogen; Z is vinyl, halogen or lower alkyl; and p is from 0 to 5. These resins include homopolymers of styrene, chlorostyrene and vinyltoluene, random copolymers of styrene with one or more monomers illustrated by acrylonitrile, butadiene, α-methylstyrene, ethylvinylbenzene, divinylbenzene and maleic anhydride, and rubber-modified polystyrenes comprising blends and grafts, wherein the rubber is a polybutadiene or a rubbery copolymer of about 98-70% styrene and about 2-30% diene monomer. These rubber-modified polystyrenes include high impact polystyrene, or HIPS.

The proportion of polystyrene in component A is not critical, since polyphenylene ethers and polystyrenes are miscible in all proportions. Component A will generally contain about 5-50% (by weight) polystyrene, if any.

Component B is at least one linear polyester. The linear polyesters include thermoplastic poly(alkylene dicarboxylates) and alicyclic analogs thereof. They typically comprise structural units of the formula $$-O-R^4-O-\overset{O}{\underset{\|}{C}}-A^1-\overset{O}{\underset{\|}{C}}-, \qquad (VII)$$

wherein $R^4$ is a saturated divalent aliphatic or alicyclic hydrocarbon radical containing about 2–10 and usually about 2–6 carbon atoms and $A^1$ is a divalent aromatic radical containing about 6–20 carbon atoms. They are ordinarily prepared by the reaction of at least one diol such as ethylene glycol, 1,4-butanediol or 1,4-cyclohexanedimethanol with at least one aromatic dicarboxylic acid such as isophthalic or terephthalic acid, or lower alkyl ester thereof. The polyalkylene terephthalates, particularly polyethylene and polybutylene terephthalate and especially the latter, are preferred. Such polyesters are known in the art as illustrated by the following patents: U.S. Pat. Nos. 2,465,319; 3,047,539; 2,720,502; 3,671,487; 2,727,881; 3,953,394; 2,822,348; 4,128,526.

Because of the tendency of polyesters to undergo hydrolytic degradation at the high extrusion and molding temperatures encountered by the compositions of this invention, it is preferred that the polyester used as component B be substantially free of water.

The polyesters generally have number average molecular weights in the range of about 20,000–70,000, as determined by intrinsic viscosity (IV) at 30° C. in a mixture of 60% (by weight) phenol and 40% 1,1,2,2-tetrachloroethane. When resistance to heat distortion is an important factor the polyester molecular weight should be relatively high, typically above about 40,000.

Because of the presence of both poly(alkylene dicarboxylates) and polymers containing carbonate units in the compositions of this invention, there is a possibility for ester-carbonate exchange resulting in degradation of one or both polymers, particularly at high molding temperatures. It is, therefore, sometimes preferred to incorporate in the compositions an agent which suppresses such exchange, typically in the amount of about 0.01–7.5% by weight of total polyester. It is generally preferred to precompound said exchange suppressing agent with the polyester, since it is frequently found that the impact strengths of the compositions of this invention are substantially decreased if the exchange suppressing agent is incorporated directly therein. Precompounding may be achieved by direct blending or by forming a concentrate, typically with about 1–25% by weight of the polyester, and adding said concentrate to the remaining portion thereof.

Illustrative exchange suppressing agents are hydroxyaromatic compounds such as the hydroxybenzophenones disclosed in U.S. Pat. No. 4,452,932; salicylate compounds such as methyl salicylate, disclosed in U.S. Pat. No. 4,452,933; and sodium and potassium dihydrogen phosphates disclosed in U.S. Pat. No. 4,532,290. The disclosures of all of the foregoing patents relating to polyesters are also incorporated by reference herein.

Component C is at least one elastomeric polyphenylene ether-compatible impact modifier. Suitable impact modifiers include various elastomeric copolymers, of which examples are ethylene-propylene-diene polymers (EPDM's), both unfunctionalized and funtionalized with (for example) sulfonate or phosphonate groups; carboxylated ethylene-propylene rubbers; block copolymers of alkenylaromatic compounds such as styrene with polymerizable olefins or dienes, including butadiene, isoprene, chloroprene, ethylene, propylene and butylene; and core-shell elastomers containing, for example, a poly(alkyl acrylate) core attached to a polystyrene shell via an interpenetrating network. Such core-shell elastomers are more fully disclosed in U.S. Pat. No. 4,681,915.

The preferred impact modifiers are block (typically diblock, triblock or radial teleblock) copolymers of alkenylaromatic compounds and dienes. Most often, at least one block is derived from styrene and at least one other block from at least one of butadiene and isoprene. Especially preferred are the triblock copolymers with polystyrene end blocks and diene-derived midblocks. It is frequently advantageous to remove (preferably) or reduce the aliphatic unsaturation therein by selective hydrogenation. The weight average molecular weights of the impact modifiers are typically in the range of about 50,000–300,000. Block copolymers of this type are commercially available from Shell Chemical Company under the trademark KRATON, and include KRATON D1101, G1650, G1651, G1652, G1657 and G1702.

According to the present invention, the tendency of blends of components A and B to be incompatible is overcome by incorporating component D in the composition. The essential ingredient of component D is a polymer containing a substantial proportion of aromatic polycarbonate units.

Among the preferred polymers of this type are the aromatic polycarbonate homopolymers. The structural units in such homopolymers generally have the formula $$-O-A^2-O-\overset{O}{\underset{\|}{C}}-, \qquad (VIII)$$

wherein $A^2$ is an aromatic radical. Suitable $A^2$ values include m-phenylene, p-phenylene, 4,4'-biphenylene, 2,2-bis(4-phenylene)propane, 2,2-bis(3,5-dimethyl-4phenylene)-propane and similar radicals such as those which correspond to the dihydroxyaromatic compounds disclosed by name or formula (generic or specific) in U.S. Pat. No. 4,217,438. Also included are radicals containing non-hydrocarbon moieties. These may be substituents such as chloro, nitro, alkoxy and the like, and also linking radicals such as thio, sulfoxy, sulfone, ester, amide, ether and carbonyl. Most often, however, all $A^2$ radicals are hydrocarbon radicals.

The $A^2$ radicals preferably have the formula $$-A^3-Y-A^4-, \qquad (IX)$$

wherein each of $A^3$ and $A^4$ is a single-ring divalent aromatic radical and Y is a bridging radical in which one or two atoms separate $A^3$ from $A^4$. The free valence bonds in formula IX are usually in the meta or para positions of $A^3$ and $A^4$ in relation to Y. Such $A^2$ values may be considered as being derived from bisphenols of the formula $HO-A^3-Y-A^4OH$. Frequent reference to bisphenols will be made hereinafter, but it should be understood that $A^2$ values derived from suitable compounds other than bisphenols may be employed as appropriate.

In formula IX, the $A^3$ and $A^4$ values may be unsubstituted phenylene or substituted derivatives thereof, illustrative substituents (one or more) being alkyl, alkenyl (e.g., crosslinkable-graftable moieties such as vinyl and allyl), halo (especially chloro and/or bromo), nitro, alkoxy and the like. Unsubstituted phenylene radicals are preferred. Both $A^3$ and $A^4$ are preferably p-phenylene, although both may be o-or m-phenylene or one o- or m-phenylene and the other p-phenylene.

The bridging radical, Y, is one in which one or two atoms, preferably one, separate $A^3$ from $A^4$. It is most often a hydrocarbon radical and particularly a saturated radical such as methylene, cyclohexylmethylene, 2-[2.2.1]-bicycloheptylmethylene, ethylene, 2,2-propylene, 1,1-(2,2-dimethylpropylene), 1,1-cyclohexylene, 1,1-cyclopentadecylene, 1,1-cyclododecylene or 2,2-adamantylene, especially a gem-alkylene radical. Also included, however, are unsaturated radicals and radicals which are entirely or partially composed of atoms other than carbon and hydrogen. Examples of such radicals are 2,2-dichloroethylidene, carbonyl, thio and sulfone. For reasons of availability and particular suitability for the purposes of this invention, the preferred radical of formula VIII is the 2,2-bis(4-phenylene)-propane radical, which is derived from bisphenol A and in which Y is isopropylidene and $A^3$ and $A^4$ are each p-phenylene.

Various methods of preparing polycarbonate homopolymers are known, and any of them may be used for preparing component D. They include interfacial and other methods in which phosgene is reacted with bisphenols, transesterification methods in which bisphenols are reacted with diaryl carbonates, and methods involving conversion of cyclic polycarbonate oligomers to linear polycarbonates. The latter method is disclosed in European patent application No. 162,379 and in co-pending, commonly owned applications Ser. No. 704,122, filed Feb. 22, 1985, now U.S. Pat. No. 4,644,053 and Ser. No. 723,672, filed Apr. 16, 1985 now U.S. Pat. No. 4,605,731.

Various copolycarbonates are also useful as component D. One example thereof is the polyester-polycarbonates of the type obtained by the reaction of at least one dihydroxyaromatic compound with a mixture of phosgene and at least one dicarboxylic acid chloride, especially isophthaloyl chloride, terephthaloyl chloride or both. Such polyester-polycarbonates contain structural units of formula VIII combined with units of the formula

wherein $A^5$ is an aromatic and usually a p- or m-phenylene radical. Other examples are the siloxane-carbonate block copolymers disclosed, for example, in U.S. Pat. Nos. 3,189,662 and 3,419,634, and the polyphenylene ether-polycarbonate block copolymers of U.S. Pat. Nos. 4,374,223 and 4,436,876, which frequently provide compositions with substantially higher heat distortion temperatures than those containing homopolycarbonates. The disclosures of the patents and applications listed above relating to polycarbonates and copolycarbonates are also incorporated by reference herein.

The copolycarbonates should, for the most part, contain at least about 20% by weight of carbonate structural units. When the copolymeric units are other than ester units, the polymer preferably contains at least about 45% carbonate units.

The weight average molecular weight of the homo- or copolycarbonate should be at least about 40,000 (as determined by gel permeation chromatography relative to polystyrene) for maximum impact strength. It is most often in the range of about 40,000–80,000 and especially about 50,000–80,000. However, compositions in which component D has a molecular weight in the range of about 80,000–200,000 often have very high impact strengths, as noted hereinafter.

In most instances, component D consists of the polycarbonate or copolycarbonate; that is, said polymer is the entire component except for impurities. It is within the scope of the invention, however, to use as component D a blend of a polycarbonate or polyester-polycarbonate with a styrene homopolymer, typically having a number average molecular weight of about 50,000–250,000. Such blends generally contain at least 50% of the polycarbonate or polyester-polycarbonate.

It will be noted that various polystyrenes may be used in the invention as all or part of components A, C and D. However, the specific polystyrenes used are different in various respects. The polystyrene in component A is a homopolymer, random copolymer or rubber-modified polystyrene; component C may be a block or core-shell copolymer; and homopolymers are used in component D. Moreover, polystyrenes are ordinarily present in only one of components A and D, if in either.

It is also within the scope of the invention to employ a polyester-aromatic polycarbonate blend as a source of part or all of components B and D. As explained hereinafter, the use of such a blend may provide somewhat more flexibility in component proportions.

Particularly in compositions containing inactivated polyphenylene ethers and relatively small amounts of polycarbonate, it is frequently found that impact strength and/or resistance to heat distortion are improved if there is also blended into the composition (E) at least one compound selected from those containing at least one cyanurate or isocyanurate moiety and those containing a plurality of epoxide moieties. Illustrative cyanurates and isocyanurates are. cyanuric chloride, triethyl cyanurate, triallyl cyanurate, triallyl isocyanurate and triphenyl cyanurate. Epoxide compounds include homopolymers of such compounds as glycidyl acrylate and glycidyl methacrylate, as well as copolymers thereof, preferred comonomers being lower alkyl acrylates, methyl methacrylate, acrylonitrile and styrene. Also useful are epoxy-substituted cyanurates and isocyanurates such as triglycidyl isocyanurate.

In various respects, the proportions of ingredients in the compositions of this invention are an important consideration. It is generaly contemplated that components A and B will each be present in the compositions described hereinabove in the amount of about 10–45%, preferably about 15–45%, of total resinous components. Moreover, the weight ratio of component A to component B should be at most 1.2:1, since if component A is present in greater amounts the impact strength of the composition may decrease sharply. Said weight ratio is preferably about 0.7–1.0:1.

Component C, the elastomeric impact modifier, may be present in the amount of about 8–25% and especially about 10–20%. Since a decrease in the proportion of component C frequently increases heat distortion temperature, the level thereof should be minimized if high resistance to heat distortion is desired.

With respect to the proportion of component D, the compatibilizing polymer, the invention includes three major embodiments although species outside these embodiments are also contemplated. The first embodiment includes compositions containing about 10–40% of component D. In such compositions, component A is typically a polyphenylene ether which has not been inactivated. In most instances, levels of components A, B and D of about 15–35%, 15–35% and 20–40% (respectively) are preferred in such compositions for maximum impact strength.

When component A is not inactivated and components B and D are supplied in full or in part by a polyester-aromatic polycarbonate blend, it is frequently possible to attain the desired high impact strengths by using proportions of certain components outside of those previously described. This is true in at least two respects: the possibility of using a lower proportion of component B with respect to component A, and of employing more than 40% of component D. Thus, another aspect of the present invention is compositions comprising the following components and any reaction products thereof: about 15–35% of polyphenylene ether as component A, about 10–35% of component B, about 10–25% of component C and from 12% to about 50% of at least one aromatic polycarbonate as component D, with the provisos that all of component B and at least about 60% of component D are supplied as a poly(alkylene dicarboxylate)-aromatic polycarbonate blend, and that the weight ratio of component A to component B is at most about 1.8:1 and preferably about 0.7–1.8:1.

In the second embodiment, component A is an inactivated polyphenylene ether and the proportions of components A and B are each about 30–45%. The proportion of component D is about 3–10%, and the blend may also include component E in the amount of about 0.1–3.0 and preferably at least about 0.25 part per 100 parts of total components A, B, C and D. This embodiment is often characterized by relatively high heat distortion temperatures.

It is within the scope of this second embodiment to introduce component E by blending with the other components in a single blending operation. However, it is often preferred to premix component E with component B, typically by dry mixing following by preextrusion. Such premixing increases the melt viscosity of component B, probably by increasing molecular weight, and frequently also increases the impact strength of the composition of the invention.

In the third embodiment, component A is an inactivated polyphenylene ether and the polycarbonate has a weight average molecular weight in the range of about 80,000–200,000, preferably about 150,000–200,000. Compositions in which these polycarbonates and other components are present in the same proportions as in the second embodiment are generally characterized by high impact strengths even when component E is absent.

The chemical roles of the inactivated polyphenylene ether and of component E in the compositions of this invention are not fully understood, and any reliance on chemical theory as a basis for the invention is specifically disclaimed. It is believed, however, that the presence of more than a certain minimum proportion of amino compounds in the polyphenylene ether can cause degradation in the molecular weight of the polycarbonate. Such amino compounds include, in addition to the aminoalkyl end groups, traces of amines (particularly secondary amine) in the catalyst used to form the polyphenylene ether. If this is true, the removal or neutralization of the greater part of such amino compounds produces an environment in which high molecular weight is maintained in the polycarbonate, thus maximizing its effect as a compatibilizing agent.

The compositions of this invention have been shown by scanning electron microscopy to consist essentially of particles of polyphenylene ether (component A) dispersed in a continuous polyester-containing phase. The size and shape of said particles varies with such factors as the proportion of polyphenylene ether in the composition. The elastomeric impact modifier (component C) is present substantially entirely in the disperse phase. By reason of the size and shape of the disperse phase particles and/or their degree of adhesion to the continuous phase, the compositions are highly resistant to delamination and similar types of failure under stress.

It is within the scope of the invention for the composition to contain other conventional ingredients such as fillers, flame retardants, pigments, dyes, stabilizers, antistatic agents, mold release agents and the like. The presence of other resinous components is also contemplated. These include impact modifiers compatible with component B, such as various graft and core-shell copolymers of such monomers as butadiene, styrene, butyl acrylate and methyl methacrylate. It is frequently preferred to preextrude such impact modifiers with component B prior to its utilization in the invention. By this method, compositions having improved ductility at low temperatures may be prepared.

Also included as other resinous components are other impact and processability modifiers for component A, such as olefin copolymers. In general, the amounts of any other resinous components, if present, will not exceed about 15% by weight of total resin.

The preparation of the compositions of this invention is normally achieved by merely blending the ingredients thereof under conditions adapted fo the formation of an intimate blend. Such conditions often include extrusion, which may be conveniently effected in a screwtype or similar extruder which applies a substantial shearing force to the composition, thereby decreasing the particle size thereof. The extrusion temperature is generally in the range of about 100°–325° C.

The extrusion conditions may affect the impact strength and other properties of the composition. For example, it is sometimes found that the impact strength of the composition is increased if it is extruded more than once, thereby insuring effective blending.

In another embodiment, a single extruder is employed which has at least two ports for introduction of ingredients, one such port being downstream from the other. Component A or any reactants for preparation thereof and at least a portion of component C are introduced through the first port and extruded, preferably at a temperature in the range of about 300°–350° C. This portion of the extruder is preferably vacuum vented.

The remaining ingredients are introduced through the downstream port and extrusion is continued, preferably at a lower temperature to minimize degradation of components B and C. For further minimization of degradation, it may be advantageous to introduce a portion of component C at this point. Typical extrusion temperatures at this stage are in the range of about 260°–320° C.

In the following examples illustrating the inventions, the blend constituents used were as follows:

COMPONENT A

PPE—a poly(2,6-dimethyl-1,4-phenylene ether) having a number average molecular weight of about 20,000 and an intrinsic viscosity in chloroform at 25° C. of 0.46 dl./g; it was found to contain about 1000 ppm. nitrogen.

Example 1, etc.—the products of the designated examples. The product of Example 2 contained about 600 ppm. nitrogen.

Example 2 (etc.)-NVV—a product similar to that of Example 2 (etc.) but prepared with atmospheric rather than vacuum venting.

PPE-VV—PPE which has been extruded on a twin screw extruder within the temperature range of about 300°-315° C., with vacuum venting to a maximum pressure of 20 torr; it contained 438 ppm. nitrogen.

COMPONENT B

PBT(50,000) and PBT(25,000)—poly(butylene terephthalates) having number average molecular weights, as determined by gel permeation chromatography, of about 50,000 and 25,000, respectively.

PBT-ES—PBT(50,000) containing $NaH_2PO_4$ as an exchange-suppressing agent. The $NaH_2PO_4$ was preblended with a portion of the polyester to a level of 1.8% by weight, after which 20% of said polyester was blended with untreated polyester.

PET(28,000) and PET(45,000)—poly(ethylene terephthalates) having number average molecular weights of about 28,000 and 45,000, respectively, as determined from intrinsic viscosity at 30° C. in a 3:2 (by weight) mixture of phenol and 1,1,2,2-tetrachloroethane.

COMPONENT C

SEBS—a commercially available triblock copolymer with polystyrene end blocks having weight average molecular weights of 29,000 and a hydrogenated butadiene midblock having a weight average molecular weight of 116,000.

SBS—a triblock copolymer similar to SEBS but containing an unhydrogenated butadiene midblock.

SB(H)—a styrene-butadiene diblock copolymer having a weight average molecular weight of about 164,000 and a butadiene-styrene weight ratio of about 2:1, in which the butadiene block has been hydrogenated.

SI(H)—a diblock copolymer similar to SB(H) but containing a hydrogenated isoprene block.

CS—a core-shell polymer with a poly(butyl acrylate) core and polystyrene shell, connected via an interpenetrating network.

COMPONENT D

PC(43,000), PC(50,000), PC(71,000), PC(192,000)—bisphenol A homopolycarbonates prepared interfacially and having weight average molecular weights of about 43,000, 50,000, 71,000 and 192,000, respectively.

PC-Trans—a bisphenol A homopolycarbonate prepared by transesterification of diphenyl carbonate and having a weight average molecular weight of about 37,000.

SH-PC—a 2,2-bis(3,5-dimethyl-4-hydroxyphenyl)propane polycarbonate prepared interfacially and having a weight average molecular weight of about 50,000.

Allyl-PC—a copolycarbonate of 97.3 mole percent bisphenol A and 2.7 mole percent 2,2-bis(3-allyl-4-hydroxyphenyl)propane, prepared interfacially and having a weight average molecular weight of about 47,000.

PPE-PC—a block poly(2,6-dimethyl-1,4-phenylene ether)-bisphenol A polycarbonate copolymer in which the two blocks have approximately equal molecular weights.

PE-PC—a polyester-polycarbonate containing 78 mole percent polyester and 22 mole percent polycarbonate units and having a weight average molecular weight of about 50,000, prepared by the interfacial reaction of bisphenol A with phosgene and a 93:7 (by weight) mixture of isophthaloyl and terephthaloyl chloride.

PC-SIL—a block copolymer containing 76% bisphenol A polycarbonate units and 24% poly(dimethylsiloxane) units, having a weight average molecular weight of about 50,000.

PS—a commercially available styrene homopolymer having a number average molecular weight of about 106,000 and an intrinsic viscosity in toluene at 25° C. of 0.80 dl./g.

COMPONENT E

TGIC—triglycidyl isocyanurate.

GMA—a glycidyl methacrylate homopolymer having an intrinsic viscosity in chloroform at 25° C. 0.16.

GMA-AA(15) and GMA-AA(30)—commercially available terpolymers of glycidyl methacrylate, methyl methacrylate and a lower alkyl acrylate, respectively containing 15% and 30% (by weight) glycidyl methacrylate units and having weight average molecular weights of about 11,400 and 9,000.

GMA-M—a commercially available copolymer of glycidyl methacrylate (50% by weight) and methyl methacrylate, having a weight average molecular weight of about 10,000.

GMA-S—a commercially available copolymer of glycidyl methacrylate (50% by weight) and styrene, having a weight average molecular weight of about 11,000.

GMA-S-M—a commercially available terpolymer of glycidyl methacrylate (50% by weight), styrene and molecular weight of about 10,000.

GMA-S-A(10A), GMA-S-A(10B), GMA-S-A(20)—commercially available terpolymers of glycidyl methacrylate, styrene and acrylonitrile, respectively containing 10%, 10% and 20% (by weight) glycidyl methacrylate and having weight average molecular weights of about 8,700, 50,000 and 8,100.

Percentages and other proportions in the examples are by weight and are based on total resinous constituents. Impact and tensile values were determined in British units and have been converted to metric units. Heat distortion temperatures are at 0.455 MPa. unless otherwise indicated.

EXAMPLES 7-13

A series of compositions according to the invention was prepared by tumble mixing the ingredients in a jar mill for ½ hour and extruding at 120°-287° C. on a twin screw extruder with a screw speed of 400 rpm. The extrudate was quenched in water and pelletized. The pellets were then injection molded into test bars which were evaluated for notched Izod impact strength according to ASTM procedure D256. (An impact strength greater than about 105 joules/m. is generally an indication of suitability as a molding composition, and a value above about 550 is exceptional.) Certain compositions were also tested for heat distortion temperature according to ASTM procedure D648. The fracture surfaces of the Izod test bars were inspected for delamination and none was detected.

The relevant parameters and test results are given in Table I.

TABLE I

|  | Example | | | | | | |
|---|---|---|---|---|---|---|---|
|  | 7 | 8 | 9 | 10 | 11 | 12 | 13 |
| Component A: PPE, % | 21 | 27 | 25 | 25 | 21 | 21 | 21 |
| Component B, %: | | | | | | | |
| PBT(50,000) | 29 | 27 | 25 | 25 | — | — | 29 |
| PET(28,000) | — | — | — | — | 29 | — | — |
| PET(45,000) | — | — | — | — | — | 29 | — |
| Component C, %: | | | | | | | |
| SEBS | 14 | 13 | 19 | — | 14 | 14 | — |
| SI(H) | — | — | — | 19 | — | — | — |
| SBS | — | — | — | — | — | — | 14 |
| Component D: PC(50,000), % | 36 | 33 | 31 | 31 | 36 | 36 | 36 |
| Izod impact strength, joules/m. | 603 | 160 | 609 | 550 | 198 | 278 | 598 |

The heat distortion temperature of the product of Example 7 was 106° C. (83° C. at 1.82 MPa.).

EXAMPLE 14

The effect of multiple extrusions and the solvent resistance of a blend identical in composition to that of Example 7 were tested. After one extrusion, the blend had an Izod impact strength of 454 joules/m.; upon extrusion a second time, the impact strength was increased to 641 joules/m.

In a solvent resistance test, the test specimen having an impact strength of 641 joules/m. was immersed in gasoline for two days under stress. It was then found to have an impact strength of 214 joules/m., which is still a respectably high figure. No signs of dissolution or deterioration were noted.

EXAMPLES 15-20

The procedure of Example 7 was repeated, using other resins as components B and D. The relevant parameters and results are given in Table II. No delamination of any specimen was observed.

TABLE II

|  | Example | | | | | |
|---|---|---|---|---|---|---|
|  | 15 | 16 | 17 | 18 | 19 | 20 |
| Component A: PPE, % | 28 | 28 | 31 | 31 | 34 | 34 |
| Component B: PBT-ES, % | 28 | 28 | 31 | 31 | 34 | 34 |
| Component C: SEBS, % | 19 | 19 | 19 | 19 | 19 | 19 |

TABLE II-continued

|  | Example | | | | | |
|---|---|---|---|---|---|---|
|  | 15 | 16 | 17 | 18 | 19 | 20 |
| Component D, %: | | | | | | |
| PC(50,000) | 25 | — | 19 | — | 12 | — |
| PC(71,000) | — | 25 | — | 19 | — | 12 |
| Izod impact strength, joules/m. | 625 | 801 | 694 | 790 | 139 | 112 |
| Heat distortion temp., °C. | 111 | — | — | — | 127 | — |

EXAMPLES 21-28

The procedure of Example 7 was repeated, using other resins as components B, C and D. The relevant parameters and test results are given in Table III. No delamination of any specimen was observed.

TABLE III

|  | Example | | | | | | | |
|---|---|---|---|---|---|---|---|---|
|  | 21 | 22 | 23 | 24 | 25 | 26 | 27 | 28 |
| Component A: PPE, % | 21 | 21 | 21 | 28 | 21 | 34 | 31 | 28 |
| Component B: PBT-ES, % | 29 | 29 | 29 | 28 | 29 | 34 | 31 | 28 |
| Component C: SEBS, % | 14 | 14 | 14 | 19 | 14 | 19 | 13 | 19 |
| Component D, %: | | | | | | | | |
| PC(43,000) | 36 | — | — | — | — | — | — | — |
| SH-PC | — | 36 | 18 | — | — | — | — | — |
| PE-PC | — | — | — | — | 36 | — | — | — |
| PPE-PC | — | — | — | — | — | 12 | 25 | 25 |
| PC-SIL | — | — | — | 25 | — | — | — | — |
| PS | — | — | 18 | — | — | — | — | — |
| Izod impact strength, joules/m. | 176 | 278 | 182 | 449 | 251 | 117 | 764 | 732 |
| Heat distortion temp., °C. | — | — | — | — | 97 | 150 | 157 | 149 |

Referring specifically to Examples 26-27 in comparison with Example 19, and Example 28 in comparison with Example 15, it will be seen that compositions containing block polyphenylene ether-polycarbonates have substantially higher heat distortion temperatures than those containing homopolycarbonates, as well as equivalent or higher impact strengths.

EXAMPLES 29-31

Following the procedure of Example 7, blends were prepared in which component B was provided entirely and component D entirely or partially by a polyester-polycarbonate blend containing 39% PBT-ES, 49% PC(50,000), 8.5% of a commercial butadiene-styrene-methyl methacrylate graft copolymer and 3.5% of various fillers and stabilizers.

The relevant parameters and results are given in Table IV. No delamination of any specimen was observed.

TABLE IV

|  | Example | | |
|---|---|---|---|
|  | 29 | 30 | 31 |
| Polyester-polycarbonate blend | 64 | 32 | 50 |
| Polycarbonate | — | 32 | 14 |
| Component A, % | 21.7 | 21.5 | 21.6 |
| Component B, % | 25.8 | 12.7 | 20.0 |
| Component C, % | 14.5 | 14.3 | 14.4 |
| Component D, % | 32.4 | 48.7 | 39.6 |
| Graft copolymer, % | 5.6 | 2.8 | 4.4 |
| Izod impact strength, joules/m. | 481 | 529 | 534 |

EXAMPLES 32-34

Compositions were prepared according to the procedure of Example 7, except that the extrusion temperature range was 120°–260° C. In these compositions, component A was the product of Example 1 and the other components are as listed in Table V.

Test bars were molded and evaluated for notched Izod impact strength, heat distortion temperature and tensile properties (ASTM procedure D638). The relevant parameters and test results are also given in Table V.

TABLE V

|  | Example | | |
|---|---|---|---|
|  | 32 | 33 | 34 |
| Component A: Example 1, % | 40 | 41.4 | 40 |
| Component B: PBT(50,000), % | 40 | 41.4 | 40 |
| Component C: SEBS, % | 12 | 9.1 | 12 |
| Component D: PC(50,000), % | 8 | 8.1 | 8 |
| Component E: TGIC, phr. | — | 0.5 | 0.8 |
| Izod impact strength, joules/m. | 107 | 166 | 267 |
| Heat distortion temp., °C. | — | 166 | 156 |
| Tensile strength at yield, MPa. | 44.9 | — | 46.0 |
| Tensile elongation, % | 45 | — | 58 |

EXAMPLE 35

Test bars of the composition of Example 34 were immersed in gasoline for three days under stress. At the end of this time, the Izod impact strength was 155 joules/m., the tensile strength at yield was 27.1 MPa., and the tensile elongation was 20%. Upon immersion of similar test bars in water at room temperature or at its boiling point for three days, and upon aging at 80° C. for one week, weight and dimensional changes substantially less than 1% were observed.

EXAMPLES 36–43

Following the procedure of Example 32, compositions were prepared from the product of Example 3 and its atmospherically vented counterpart. The relevant parameters and test results are given in Table VI.

TABLE VI

|  | Example | | | | | | | |
|---|---|---|---|---|---|---|---|---|
|  | 36 | 37 | 38 | 39 | 40 | 41 | 42 | 43 |
| Component A, %: | | | | | | | | |
| Example 3 | 40 | 40 | 40 | 40 | 42 | 40 | 40 | — |
| Example 3-NVV | — | — | — | — | — | — | — | 40 |
| Component B, %: | | | | | | | | |
| PBT(50,000) | 40 | 40 | 40 | 40 | 42 | — | 40 | 40 |
| PBT(25,000) | — | — | — | — | — | 40 | — | — |
| Component C, % | | | | | | | | |
| SEBS | 12 | 12 | 12 | 12 | 12 | 12 | — | 12 |
| SB(H) | — | — | — | — | — | — | 12 | — |
| Component D, %: | | | | | | | | |
| PC(50,000) | 8 | 8 | 8 | — | — | — | 8 | 8 |
| PC(71,000) | — | — | — | 8 | 4 | 8 | — | — |
| Component E: TGIC, phr. | 0.8 | 0.32 | 0.5 | 0.8 | 0.8 | 0.8 | 0.8 | 0.8 |
| Izod impact strength, joules/m. | 790 | 673 | 828 | 806 | 395 | 192 | 219 | 155 |
| Heat distortion temp., °C. | 177 | 148 | 175 | 158 | — | 156 | 172 | — |
| Tensile strength at yield, MPa. | 46.9 | 47.9 | 50.1 | 46.9 | — | 45.5 | 47.6 | — |
| Tensile elongation, % | 96 | 54 | 106 | 69 | — | 48 | 40 | — |

EXAMPLE 44

Test bars of the composition of Example 36 were immersed in gasoline for four days under stress. At the end of this time, the Izod impact strength was 769 joules/m., the tensile strength at yield was 33.9 MPa. and the tensile elongation was 144%.

EXAMPLES 45–48

Following the procedure of Example 32, compositions were prepared in which components A, C and D varied in additional respects. The relevant parameters and test results are given in Table VII.

TABLE VII

|  | Example | | | |
|---|---|---|---|---|
|  | 45 | 46 | 47 | 48 |
| Component A, %: | | | | |
| Example 6 | 40 | — | — | — |
| PPE-VV | — | 40 | 40 | 40 |
| Component B: PBT(50,000), % | 40 | 40 | 40 | 40 |
| Component C, %: | | | | |
| SEBS | 12 | 12 | 12 | — |
| CS | — | — | — | 12 |
| Component D, %: | | | | |
| PC(50,000) | 8 | 8 | — | 8 |
| PC(192,000) | — | — | 8 | — |
| Component E: TGIC, phr. | 0.8 | 0.5 | — | 0.5 |
| Izod impact strength, joules/m. | 785 | 769 | 764 | 486 |
| Heat distortion temperature, °C. | — | 167 | — | — |

EXAMPLES 49–51

Following the procedure of Example 32, compositions were prepared using as components B and D the following preextruded blend:

| | |
|---|---|
| PBT(50,000) | 69.55% |
| PC(50,000) | 15% |
| PBT impact modifier | 15% |
| Stabilizers, exchange suppressor | 0.45%. |

The PBT impact modifier was "KM-330", a poly(butyl acrylate)-poly(methyl methacrylate) core-shell polymer commercially available from Rohm & Haas Company.

The parameters and test results for Examples 49–51 are given in Table VIII.

TABLE VIII

|  | Example | | |
|---|---|---|---|
|  | 49 | 50 | 51 |
| Component A, %: | | | |
| Example 3 | 36.6 | — | — |
| PPE-VV | — | 36.6 | 36.6 |
| Component B, %: | 36.4 | 36.4 | 36.4 |
| Component C: SEBS, % | 11.2 | 11.2 | 11.2 |
| Component D, %: | 7.9 | 7.9 | 7.9 |
| Component E: TGIC, phr. | 0.4 | 0.4 | — |
| KM-330, % | 7.9 | 7.9 | 7.9 |
| Izod impact strength, joules/m. | 721 | 192 | 198 |

EXAMPLE 52

A twin screw extruder with two vacuum vents and two charging ports, one downstream from the other, was used. The first port was charged with 30 parts of PPE, 14 parts of SEBS and minor proportions of stabilizers and pigments. These materials were extruded at temperatures in the range of about 315°–350° C. and pressures in the range of about 150–205 torr. These were added through the downstream port 46 parts of PBT(50,000) and 10 parts of PC(71,000), and extrusion was continued at temperatures in the range of 260°–315° C. and pressures of about 635 torr. The extrudate was the desired product.

EXAMPLES 53–56

Following the procedure of Example 32, compositions were prepared in which various polycarbonates were used as component D. The relevant parameters and test results are given in Table IX.

TABLE IX

|  | Example | | | |
|---|---|---|---|---|
|  | 53 | 54 | 55 | 56 |
| Component A, %: | | | | |
| PPE-VV | 40 | — | — | — |
| Example 2 | — | 40 | 40 | 40 |
| Component B: PBT(50,000), % | 40 | 40 | 40 | 40 |
| Component C: SEBS, % | 12 | 12 | 12 | 12 |
| Component D; %: | | | | |
| PC-Trans | 8 | 8 | 8 | — |
| Allyl-PC | — | — | — | 8 |
| Component E: TGIC, phr. | — | — | 0.5 | — |
| Izod impact strength, joules/m. | 182 | 256 | 828 | 278 |

EXAMPLES 57–67

Following the procedure of Example 32, compositions were prepared containing 40% of the inactivated polyphenylene ether of Example 3, 40% PBT(50,000), 12% SEBS, 8% PC(50,000) and, as component E, various materials. The identity of these materials and the test results are given in Table X.

TABLE X

| Example | Component E Identity | Amt., phr. | Izod impact strength joules/m. | Tensile strength at break MPa. | Tensile elongation, % |
|---|---|---|---|---|---|
| 57 | — | — | 219 | 38.8 | 45 |
| 58 | TGIC | 0.8 | 673 | 42.7 | 78 |
| 59 | GMA | 1.0 | 764 | 42.8 | 71 |
| 60 | GMA-AA(15) | 1.0 | 657 | 41.7 | 50 |
| 61 | GMA-AA(30) | 1.0 | 678 | 43.8 | 66 |
| 62 | GMA-S-M | 1.0 | 609 | 47.9 | 79 |
| 63 | GMA-S | 1.0 | 710 | 46.5 | 98 |
| 64 | GMA-M | 1.0 | 587 | 48.2 | 86 |
| 65 | GMA-S-A(10A) | 1.0 | 657 | 41.4 | 53 |
| 66 | GMA-S-A(10B) | 1.0 | 684 | 40.2 | 49 |
| 67 | GMA-S-A(20) | 1.0 | 646 | 43.2 | 65 |

The results in Table X show the improvement in impact strength which results from the incorporation of various species of component E in the compositions of this invention. Such compositions containing component E also have high impact strengths at low temperatures. For example, the composition of Example 67 had an Izod impact strength at −40° C. of 198 joules/m.

EXAMPLES 68–70

Blends similar to those of Examples 57–67 were prepared, substituting PPE-VV for the product of Example 2. The results are given in Table XI.

TABLE XI

| Example | Component E Identity | Amt., phr. | Izod impact strength, joules/m. |
|---|---|---|---|
| 68 | — | — | 294 |
| 69 | GMA | 1.0 | 680 |
| 70 | GMA-M | 1.0 | 660 |

EXAMPLES 71–75

These examples show the effect on polyester melt viscosity of premixing the polyester with component E. Premixing was effected by dry blending following by melt extrusion. The melt viscosities, or, in some cases, melt flow rates (which are inversely proportional to melt viscosities) were compared with those of controls which had been similarly extruded without the addition of component E. The melt viscosity of the polyester before extrusion was about 7,500 poises.

The relative parameters and test results are given in Table XII.

TABLE XII

| Example | Component E Identity | Amt., % | Melt viscosity, poises | Melt flow rate, g./10 min. |
|---|---|---|---|---|
| Controls | — | — | 5,900 | 38.7 |
| 71 | TGIC | 0.5 | 41,000 | — |
| 72 | TGIC | 1.0 | >135,000 | — |
| 73 | GMA | 1.0 | — | 5.0 |
| 74 | GMA-M | 1.0 | — | 3.4 |
| 75 | GMA-S-A(20) | 1.0 | — | 4.5 |

EXAMPLES 76–79

Following the procedure of Example 32, compositions were prepared containing 40% of the inactivated polyphenylene ether of Example 2, 40% poly(butylene terephthalate) which had been premixed with TGIC as described in Examples 71–75, 12% SEBS and 8% PC(50,000). They were compared with Controls I and II prepared from untreated poly(butylene terephthalates), and Control III, wherein the TGIC was dry blended with all of the other components. The relative parameters and test results are given in Table XIII.

TABLE XIII

|  | Example | | | | Control | | |
|---|---|---|---|---|---|---|---|
|  | 76 | 77 | 78 | 79 | I | II | III |
| Component B, mol. wt. | 25,000 | 25,000 | 25,000 | 50,000 | 25,000 | 50,000 | 25,000 |
| Component E (TGIC): | | | | | | | |
| % based on polyester | 0.5 | 1.0 | 2.0 | 0.5 | 0 | 0 | — |
| Amt. in blend, phr. | 0.2 | 0.4 | 0.8 | 0.2 | | | 0.8 |
| Izod impact strength, joules/m. | 224 | 256 | 570 | 500 | 80 | 220 | 192 |

EXAMPLE 80

This example demonstrates the effect on impact strength of nitrogen content and molecular weight of the polyphenylene ether. Blends were prepared by the procedure of Example 32, using as component D two different bisphenol A polycarbonates prepared interfacially and as component A a number of polyphenylene ethers prepared by procedures which did not include functionalization or vacuum venting. Components B and C were PBT(50,000) and SEBS, respectively. The results are given in Table XIV.

TABLE XIV

| Polyphenylene ether IV, | | Polycarbonate mol. wt. | Izod impact strength joules/m. |
|---|---|---|---|
| dl./g. | Nitrogen, ppm. | | |
| 0.46 | 1020 | 50,000 | 20 |
| 0.40 | 1115 | " | 20 |
| 0.29 | 497 | " | 78 |
| 0.18 | 353 | " | 22 |
| 0.53 | 576 | " | 57 |
| 0.46 | 1020 | 71,000 | 26 |
| 0.40 | 1115 | " | 26 |
| 0.29 | 497 | " | 115 |
| 0.18 | 353 | " | 22 |
| 0.53 | 576 | " | 265 |

It will be seen that comparatively high impact strengths are obtained by using a polyphenylene ether having a nitrogen content no greater than 800 ppm. and an intrinsic viscosity of at least 0.25 dl./g.

EXAMPLE 81

This example shows the effect of fumaric acid level in the inactivated polyphenylene ether on the impact strengths of the compositions. The procedure of Example 32 was employed to prepare compositions from 40% of various fumaric acid-inactivated polyphenylene ethers, 40% PBT(50,000), 12% SEBS, 8% PC(50,000) and, in certain cases, 0.32 phr. of TGIC. The impact strengths of the compositions are given in Table XV.

TABLE XV

| Polyphenylene ether | TGIC | Impact strength, joules/m. |
|---|---|---|
| Ex. 2 | No | 155 |
| Ex. 4 | No | 198 |
| Ex. 5 | No | 294 |
| Ex. 2 | Yes | 700 |
| Ex. 4 | Yes | 774 |
| Ex. 5 | Yes | 726 |

It is apparent that increasing levels of fumaric acid result in substantial increases in impact strength in the absence of component E. The presence of component E inherently causes such a profound increase in impact strength that the effect of fumaric acid level becomes insignificant.

EXAMPLES 82-84

Formulations having the weight ratios indicated in Table XVI were prepared by blending and extrusion of the components on a Werner-Pfleiderer twin screw extruder.

The extruder had two stages. The PPE, polystyrene and half the SEBS were fed to the extruder at its throat in order to ensure intimate mixing. This first stage of the extruder had a set temperature of about 350° to 360° C. and vacuum was applied to the melt. The PBT, PC and remaining SEBS were fed downstream at the second stage of the extruder which had a set temperature of about 240° to 250° C. This second stage provided adequate shear mixing of the components while avoiding potential degradation of the components due to exposure to high temperatures for longer periods.

The extrudate was quenched in water and pelletized. The pellets were then injection molded into test specimens which were evaluated for heat distortion temperature, flow channel, Dynatup impact, notched Izod impact and tensile yield and elongation. Test results are given in Table XVI.

TABLE XVI

| | Examples | | |
|---|---|---|---|
| | 82 | 83 | 84 |
| Formulation | | | |
| Component A, %: | | | |
| PPE | 31.3 | 28.3 | 28.3 |
| Polystyrene homopolymer[a] | — | 9.4 | — |
| HIPS[b] | — | — | 9.4 |
| Component B: PBT(50,000), % | 47.9 | 43.4 | 43.4 |
| Component C: SEBS, % | 12.5 | 11.3 | 11.3 |
| Component D: PC(71,000), % | 8.3 | 7.6 | 7.6 |
| Properties | | | |
| Heat distortion temperature, °C. | 147 | 154 | 150 |
| Flow channel, cm. | 39.4 | 53.3 | 48.3 |
| Dynatup impact, joules | | | |
| room temperature | 44.7 | 51.5 | 52.9 |
| −29° C. | 47.5 | 50.2 | 56.9 |
| Notched Izod, joules/m. | 828 | 662 | 651 |
| Tensile yield, MPa. | 41.4 | 47.6 | 50.3 |
| Tensile elongation, % | 43 | 29 | 29 |

[a]Shell 203 clear crystal polystyrene
[b]American Hoechst 1897 rubber modified polystyrene

EXAMPLES 85-88

In this series of examples, blends were prepared in the same manner as described above for Examples 82-84. The weight ratio of the polyphenylene ether to polystyrene (American Hoechst 1897 high impact polystyrene) was varied. In this series, component B was 45% BPT(50,000), component C was 12% SEBS and component D was 8% PC(71,000). Table XVII indicates the manner in which the polyphenylene ether and the polystyrene were varied and reports the results of the physical property tests. It is evident that the proportions of polyphenylene ether and polystyrene can be widely varied and still provide a variety of useful thermoplastic products.

TABLE XVII

| | Example | | | | Control |
|---|---|---|---|---|---|
| | 85 | 86 | 87 | 88 | |
| Formulation | | | | | |
| Component A, %: | | | | | |
| PPE | 35 | 30 | 25 | 20 | 0 |
| HIPS | 0 | 5 | 10 | 15 | 35 |
| Properties | | | | | |
| Heat distortion temperature, °C. | 162 | 158 | 150 | 138 | 103 |
| Flow channel, cm. | 41.9 | 44.5 | 44.5 | 54.6 | 83.8 |
| Dynatup impact, joules | | | | | |
| Room temperature | 50.2 | 47.5 | 54.2 | 50.2 | 17.6 |
| −29° C. | 62.4 | 66.4 | 54.2 | 47.5 | — |
| Notched Izod, joules/m. | 694 | 721 | 716 | 342 | 69.4 |
| Flex. modulus, GPa. | 1.85 | 1.90 | 1.91 | 1.85 | 1.70 |
| Flex. strength, MPa. | 68.3 | 68.9 | 68.9 | 64.8 | 49.6 |
| Tensile yield, MPa. | 46.2 | 49.0 | 45.5 | 48.3 | 29.6 |

TABLE XVII-continued

| | Example | | | | |
|---|---|---|---|---|---|
| | 85 | 86 | 87 | 88 | Control |
| Tensile elongation, % | 33 | 30 | 43 | 36 | 8 |

What is claimed is:

1. A method for reducing the unneutralized amino nitrogen content of a composition consisting of
 a polyphenylene ether comprising structural units having the formula

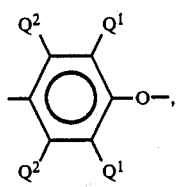

wherein in each of said units independently, each $Q^1$ is independently halogen, primary or secondary lower alkyl, phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$; and containing a substantial proportion of molecules having end groups of the formula

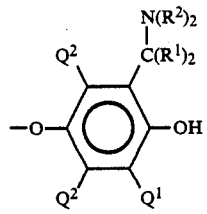

wherein each $R^1$ is independently hydrogen or alkyl, with the proviso that the total number of carbon atoms in both $R^1$ radicals is 6 or less, and each $R^2$ is independently hydrogen or a $C_{1-6}$ primary alkyl radical; or
 a mixture of said polyphenylene ether and dienealkenylaromatic compound block copolymer;
 which comprises extruding said composition at a temperature in the range of about 230°–390° C. with vacuum venting.

2. A method according to claim 1 wherein each $Q^1$ is methyl, each $Q^2$ is hydrogen, each $R^1$ is hydrogen and each $R^2$ is n-butyl.

3. A method according to claim 2 wherein the molecules having end groups of formula II constitute as much as about 90% by weight of the polyphenylene ether.

4. A method according to claim 3 wherein the extrusion temperature is in the range of about 300°–350° C.

5. A method according to claim 4 wherein the product contains unneutralized amino nitrogen, if any, in an amount no greater than 800 ppm.

6. A method according to claim 1 wherein the composition consists of said polyphenylene ether.

7. A method according to claim 1 wherein the composition consists of said polyphenylene ether and block copolymer.

* * * * *